US007685439B2

(12) United States Patent
Drescher

(10) Patent No.: US 7,685,439 B2
(45) Date of Patent: Mar. 23, 2010

(54) METHOD FOR EFFECTING THE CONTROLLED SHUTDOWN OF DATA PROCESSING UNITS

(75) Inventor: Wolfram Drescher, Dresden (DE)

(73) Assignee: NXP B.V., Eindhoven (NL)

( * ) Notice: Subject to any disclaimer, the term of this patent is extended or adjusted under 35 U.S.C. 154(b) by 297 days.

(21) Appl. No.: 10/514,850

(22) PCT Filed: May 13, 2003

(86) PCT No.: PCT/DE03/01539

§ 371 (c)(1),
(2), (4) Date: Jul. 19, 2005

(87) PCT Pub. No.: WO03/096586

PCT Pub. Date: Nov. 20, 2003

(65) Prior Publication Data

US 2006/0156062 A1    Jul. 13, 2006

(30) Foreign Application Priority Data

May 14, 2002    (DE) ................................ 102 21 529

(51) Int. Cl.
*G06F 1/00* (2006.01)
*G06F 15/76* (2006.01)
*G06F 15/80* (2006.01)

(52) U.S. Cl. ........................ 713/300; 713/322; 713/324; 712/22

(58) Field of Classification Search .................. 713/300, 713/322, 324; 712/22
See application file for complete search history.

(56) References Cited

U.S. PATENT DOCUMENTS

| 5,657,483 | A | * | 8/1997 | Kardach et al. .............. 713/601 |
| 5,719,800 | A | * | 2/1998 | Mittal et al. ................. 713/321 |
| 5,918,061 | A | | 6/1999 | Nikjou |
| RE36,839 | E | * | 8/2000 | Simmons et al. .............. 326/93 |
| 6,564,328 | B1 | * | 5/2003 | Grochowski et al. ........ 713/320 |

(Continued)

FOREIGN PATENT DOCUMENTS

EP    0 562 885 A2    9/1993

(Continued)

OTHER PUBLICATIONS

Wichman, S. et al.; The Second Generation ZSP DSP, Jan. 1, 2002, XP002278733 Gefunden im Internet.

*Primary Examiner*—Ji H Bae
(74) *Attorney, Agent, or Firm*—Baker Botts L.L.P.

(57) ABSTRACT

Methods are provided for effecting functional control of program flow and/or data flow in digital signal processors and in processors which have closed and separated modules for effecting the program and data flow control or which operate in parallel arithmetic-logic units. The methods enhance the functionality of the signal processor to such an extent that the units of the processor, without time delays, are adapted, with regard to their energy consumption, to the latest demands of signal processing. The methods provide additional possibilities for saving energy which are enabled by algorithm-related shutdown of functional units. An external hardware-related signal input into the processor or a software-related state output from the program flow in the processor may be used to trigger an interruption in the clock pulse supply for the respective functional units for the period of time during which these functional units are not used.

6 Claims, 1 Drawing Sheet

U.S. PATENT DOCUMENTS

| | | | |
|---|---|---|---|
| 6,895,520 B1 * | 5/2005 | Altmejd et al. | 713/324 |
| 7,051,221 B2 * | 5/2006 | Clabes et al. | 713/320 |
| 2002/0004916 A1 | 1/2002 | Pechanek | |

FOREIGN PATENT DOCUMENTS

| EP | 1117031 | 7/2001 |
|---|---|---|
| JP | SHO-52-071950 A | 6/1977 |
| JP | HEI-03-286213 A | 12/1991 |
| JP | HEI-08-234861 A | 9/1996 |
| JP | HEI-09-200026 A | 7/1997 |

* cited by examiner

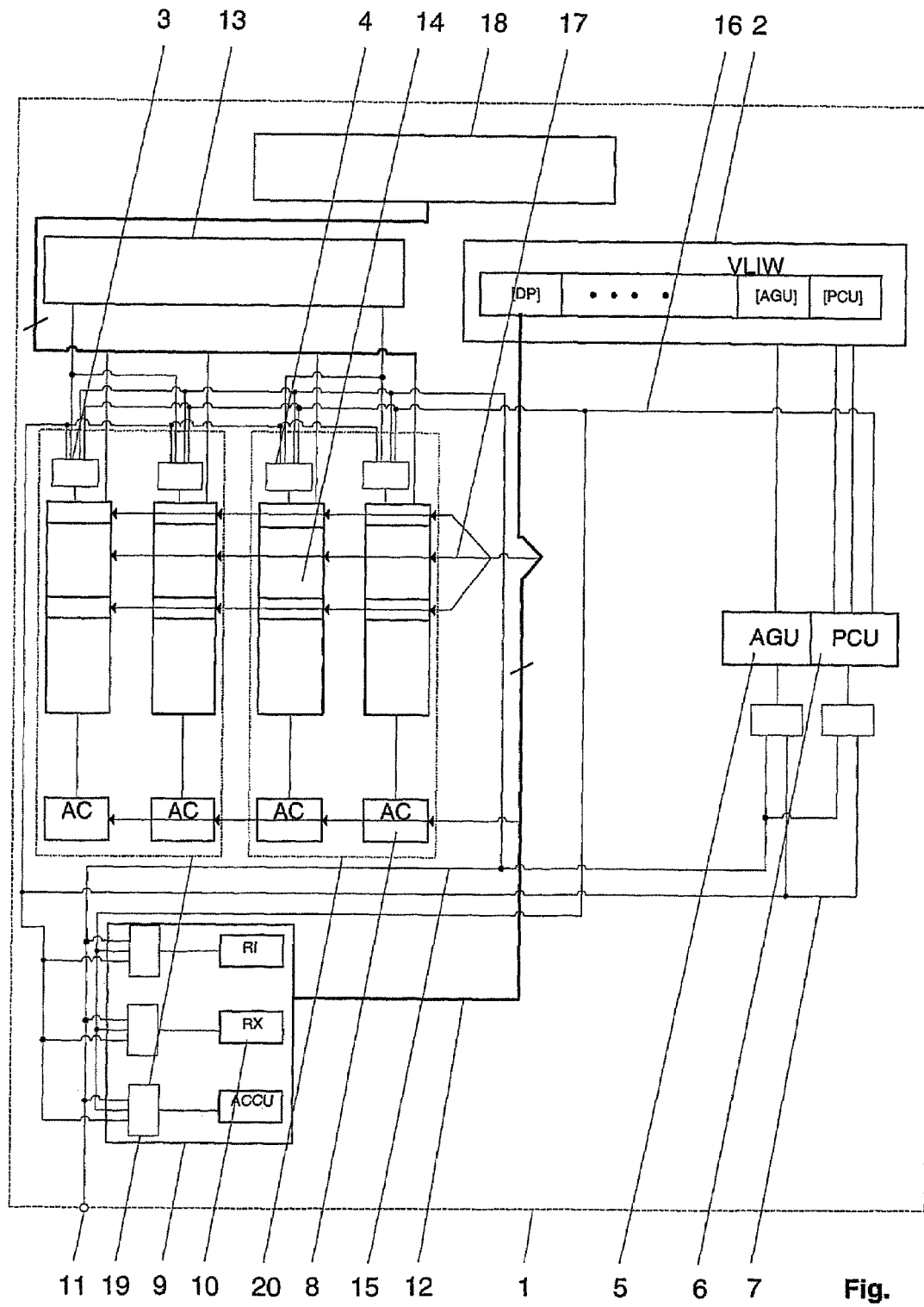

METHOD FOR EFFECTING THE CONTROLLED SHUTDOWN OF DATA PROCESSING UNITS

CROSS REFERENCE TO RELATED APPLICATIONS

This application claims the benefit of International Patent Application No. PCT/DE03/01539 filed May 13, 2003, which claims priority to German Patent Application No. 102. 21. 529.4 filed May 14, 2002, both of which applications are hereby incorporated by reference herein in their entireties.

FIELD OF THE INVENTION

The invention relates to methods of functional control of the program and/or data flow in digital signal processors and processors with respective terminated and mutually isolated modules for program and data flow control.

BACKGROUND OF THE INVENTION

In fast digital signal processors (DSPs), particularly in those with a pronounced data path structure for the parallel data processing, a large amount of power is consumed in certain modules of the processor during the signal processing. Particularly the high demands on the signal processing speed of the processors, on the one hand, and, on the other, the demand for the processors to be used in compact appliances operated on a mobile basis and, in this case, for a long standby and operating time to be provided using a battery (storage battery) power supply contain a discrepancy in the direction of development.

To resolve this conflict, the prior art involves not only the use of fundamentally energy-saving technologies but also primarily the matching of the clock rates to the signal processing tasks in order to reduce the power consumption of the processor as a whole (speed step mode). That is to say that the clock rate is reduced in steps when the processor is in standby or has a low utilization level. An opposite sequence of steps is initiated up to the maximum possible clock rate when continuous performance demands are made on the signal processing.

This procedure for reducing the power consumption has the drawback that the efficient matching to the signal processing requested only ever occurs after a time delay. In addition, this does not achieve any specific matching to particular functional units, particularly those which are responsible for the high power consumption.

Hence, those signal processors which effect an immediate power reduction as a result of external signal allocations are not known in the prior art.

A further drawback of the known energy-saving methods is that it is not possible to shut down functional units on the basis of algorithms, which means that it is not possible to make full use of additional energy-saving effects by temporarily shutting down modules which consume a lot of power while particular algorithms are being executed in the various functional units.

Consideration is now being given to ways of improving digital signal processor shut down methods. In particular, attention is directed to shut down procedures that can be initiated in response to external signal allocations. Signal processor shut down procedures that are based on algorithms are desirable.

SUMMARY OF THE INVENTION

In accordance with the principles of the invention, energy saving procedures for shutting down signal processors are provided.

The inventive procedures extend the way in which a signal processor works such that functional units in the signal processor can have their power consumption matched to the current signal processing demands after short or no time delays and that the signal processor can tap additional energy-saving potentials by shutting down functional units on the basis of algorithms.

Energy saving is achieved by virtue of the clock supply for functional units being switched off during the time in which the functional units are not being used by virtue of a hardware-related signal input or applied externally to the signal processor or by virtue of a software-related state output from a program flow internal to the signal processor.

In one advantageous version of the inventive method, a signal allocation on an external connection to or on a register in the signal processor causes the latter to be shut down totally in a "Global Halt" state. As a result, the clock supply is switched off by a first and/or second gated clock cell directly at the clock supply gate of the respective functional units of the signal processor. The signal processor adopts a "Global DSP Halt" state in which no signal processing is carried out in any of its functional units, including, for example, functional units such as the interrupt processing unit, or in the data and program stores.

Only withdrawal of the triggering signal allocation on the external connection or on the register in the processor cancels the "Global DSP Halt" state again.

This procedure provides a delay-free, direct and accurate matching of the power consumption to the signal processing carried out by each processor. It is also possible to match brief changes to the signal processing demand in an energy-efficient manner and to achieve great energy-saving effects by avoiding a power loss which is otherwise used up by the processor in waiting periods which arise, e.g., as a result of executed NOP (no-operation) instructions.

One specific variant of the advantageous version of the inventive method involves the processor being shut down totally apart from the data and/or program store in a triggered "Global Halt" state of the processor.

This variant procedure allows the program store to be able to be reloaded and for booting to be possible while the program store is active during the "Global Halt" state of the processor.

While the data store is active during the "Global Halt" state of the processor, it is possible to read out the latter, for example, for testing purposes.

A further variant of the method involves a halt instruction issued by the program prompting a "software-related halt" state to be triggered by a Program Control Unit (PCU) of the signal processor.

This is accomplished by the PCU, which identifies a halt instruction during program execution, decoding said halt instruction and, as a result, subsequently switching off the clock supply using a first and/or second gated clock cell, which represent the clock supply gates of the respective data path (DP) and also of a further processing or functional unit.

As a result, no signal processing is carried out in these particular functional units, the data storage interface remaining in operation for the purpose of data interchange with other functional units and external appliances.

This method may allow the power consumption to be accurately matched to the tasks of the signal processing in the processor. In this context too, there is energy-efficient matching to brief changes in the signal processing demand.

Depending on the software, however, this matching can be applied specifically to particular energy-critical functional units which need to be shut down. Other functional units which do not have any great power loss during signal processing and/or absolutely have to be operational for the purpose of fast communication, for example, remain in operation.

In one specific embodiment of the inventive energy saving shut down method, during the instruction execution for setting up a new (Very Long Instruction Word (VLIW) (i.e. this instruction is "in the pipeline") signal processing on the functional units is stopped.

In this case, a VLIW unit of the signal processor uses a special connection to send the PCU the instruction setup period of a plurality of clock cycles.

As a result, the PCU triggers a "Pipeline Halt" state which switches off the clock supply for the input and output registers in the respective DP and also in all functional units which are not involved in setting up the VLIW.

In this context, this state is not influenced by any software commands.

A special variant for the inventive method relates to processors whose processor architecture has a slice structure.

In such processors, data paths are combined into slices, with a respectively assigned bit length being used in a first slice to execute a signal processing operation independently of the signal processing operation executed in parallel in a second slice.

These parallel signal processing operations are executed using special instructions (e.g., Single Instruction Multiple Data (SIMD) type instructions) in the DPs which are associated with the respective slice. The slices are individually stopped in their signal processing by the PCU using a "Single Slice Halt" state which is respectively output by a Single Slice Mode (SSM) register bank.

The slices are individually controlled by virtue of the SSM register bank which implements the instructions from the PCU actuating each slice using an associated bit in the SSM register bank. A respective gated clock cell is used to switch on and off the clock supply for the registers in the DP.

This is done in a manner such that, depending on the signal processing carried out, each individual slice with its input register and/or accumulator and pipeline control register has its operation stopped and then enabled again in the meantime by the SSM register.

In this case, a register file unit (RFU) and a memory access register in the processor remain constantly in operation and the PCU can write to the SSM register bank at all times.

This specific method allows individual calculations to be carried out in parallel in the slices in line with the instruction type SIMD, but for the calculation sequences and their results to be controlled by setting the SSM register bank and hence for the results to be provided in the accumulators or result registers at different times.

Hence, to save energy after the result values have been provided in the individual slices, it is possible to stop the signal processing (which is no longer providing an abundance of results) until a further SIMD instruction is used to continue operation in the slices in parallel.

BRIEF DESCRIPTION OF THE DRAWING

Further features of the invention, its nature, and various advantages will be more apparent from the following detailed description and the accompanying drawings, wherein like reference characters represent like elements throughout, and in which:

FIG. 1 is a schematic circuit diagram of a signal processor in which an energy saving shutdown method may be implemented in accordance with in accordance with the principles of the present invention.

The following is a list of the reference numerals used in FIG. 1

1. Processor
2. VLIW (Very Long Instruction Word) unit
3. First gated clock cell
4. Second gated clock cell
5. AGU (Address Generating Unit)
6. PCU (Process Controlling Unit)
7. Clock supply line
8. Accumulator
9. Further processing unit (with gated clock cell)
10. Register in the further processing unit
11. External Global Halt Signal input
12. SIME instruction bus
13. SSM (Single Slice Mode) register bank
14. Data path
15. Global halt line

DETAILED DESCRIPTION OF THE INVENTION

The present invention provides procedures for selectively shutting down signal processing activity in a signal processor for management of energy consumption.

An inventive energy-saving procedure for managing the operation or functioning of a signal processor functions may be understood with reference to FIG. 1 and with reference to exemplary individual halt states described herein.

FIG. 1 shows a block diagram of an exemplary signal processor 1 having associated functional units which may be configured for implementation of power consumption management schemes in accordance with the present invention.

For the case of an energy-saving effect by a "Global Halt" state, it is assumed that the data which are to be calculated are supplied by an RFU 18 to the respective inputs of data path 14 and to the inputs of a further processing unit 9.

When an external signal has been applied with a requisite signal allocation, the signal is applied to the first and second gated clock cells 3 and 4 via a global halt line 15.

This signal allocation interrupts the clock supply for the respective data path DP 4 and a further processing unit 9 in the processor 1. Following withdrawal of the global halt signal, the clock supply in the functional units is immediately continued or restored.

In the case of a "Software-related Halt" state, PCU 6 analyzes the incoming instructions and identifies a halt instruction. As a result, PCU 6 actuates a program halt line 16 which is respectively connected to the first and second gated clock cells 3 and 4.

The first and second gated clock cells 3 and 4 are used to switch the clock supply only for particular functional units as a result of the signal allocation on the program halt line 16.

Hence, the signal processing in the respective data path DP 14 which is to be controlled and in the further functional unit 9 is controlled on a software-related basis, with the hardware configuration performing the selection of the particular functional units whose signal processing can be switched by software instructions. At the same time, steps are taken to ensure that the memory interface for signal processing with other functional units and external appliances of the processor 1 remains in operation regardless of the software-related control.

In the case of energy-saving control of the signal processing in the functional units, as a result of an output of the "Pipeline Halt" state, a special connection is used by a VLIW unit 2 to notify PCU 6 of the period for stopping the signal processing.

During this time, a respective new VLIW is set up in VLIW unit 2. Within the setup time, it is not possible for new instructions to be output. For this reason, this time is also used to save energy and the signal processing is stopped in the data paths by virtue of the program halt line 16 being activated, this line being used to route the signal allocation to the first and/or second gated clock cell(s) 3 and 4 in the respective data path DP 14.

Hence, the signal processing is stopped in the data path DP 14, saving energy.

If output of the "Single Slice Halt" state has an energy-saving effect, it is a prerequisite for an SIME instruction to be output by the VLIW unit 2 via the SIMD bus 12. This individual SIME instruction triggers multiple data processing in the respective data path 14 associated with a first or second slice 19 and 20. The results in the slices are provided in the respective associated accumulator 8 at different times.

In this context, a respective bit in the SSM register bank 13 is set, said bit being associated with the data path 14 of the first or second slice 19 and 20.

The signal allocation for this bit is supplied to the first and/or second gated clock cell 3 and 4 associated with the respective data path 14 of the first or second slice 19 and 20 and controls the signal processing in the data path 14 individually by stopping the clock supply on the associated input register and hence also the signal processing when a result is present in this data path 14.

When a further SIMD instruction is output on the SIME bus 12, e.g., following provision of the last result processed in a data path 14 of the respective first or second slice 19; 20, the associated bit in the SSM register bank 13 is reset and all data paths of the slices start the subsequent signal processing by reading in the data provided by the RFU 18 on their input registers.

The invention claimed is:

1. A method for functional control of execution of a program and/or data flow in a Single Instruction Multiple Data signal processor, the signal processor having parallel arithmetic and logic functional units ("ALUs") and/or data paths (DPs) for the execution of program instructions and/or data flow, wherein each ALU and/or DP has at least a gated clock cell input for receiving a clock pulse supply, the signal processor further including a program control unit (PCU), an interrupt processing unit, and data and program memories, the method comprising:

receiving at least one of a hardware-related signal, which is applied externally to the signal processor, and a software-related state output, which is generated from internal flow of the program in the signal processor; and in response to the hardware-related signal, switching off the clock supply of all ALUs and/or DPs of the signal processor that are not being used for the program execution and/or data flow for the duration of their non-use, and in response to the software-related state output, switching off the clock supply of particular ALUs and/or DPs of the signal processor that are not being used for the program execution and/or data flow for the duration of their non-use.

2. The method of claim 1, further comprising:

applying an external global halt signal to at least one of an external connection and a register in the signal processor to switch off a signal processor clock supply to the signal processor so that the signal processor is shut down in a Global DSP Halt state in which no signal processing is carried out in any of the ALUs, the interrupt processing unit, and the data and program memories of the signal processor, wherein only on withdrawal of the applied external global halt signal the signal processor exits the Global DSP Halt state.

3. The method of claim 1, wherein in a triggered Global Halt state, the signal processor is shut down totally apart from the data and/or program memories.

4. The method of claim 1, wherein a halt instruction issued by a program in the signal processor prompts said halt instruction to be identified by the PCU in the signal processor, decoded, and further causes a Software-related Halt state to be triggered in which a gated clock cell input to a particular ALU and/or DP is switched off so that no signal processing is carried out in the particular ALU while a data storage interface in the signal processor remains in operation for the purpose of data interchange with other ALUs and external appliances.

5. The method of claim 1, further comprising:

from the PCU, triggering a Pipeline Halt state which switches off the signal processor clock supply for input and output registers in DPs and that are not involved in setting up a new very long instruction word (VLIW), wherein the Pipeline Halt state is not influenced by any software commands.

6. The method of claim 1, wherein single instruction multiple data (SIMD) type instruction is signal processed in parallel in a first or second slice DP of the signal processor, wherein each individual slice DP has an input register and/or accumulator and pipeline control register, and wherein the signal processor further comprises a Single Slice Mode (SSM) register bank, which implements instructions from the signal processor PCU actuating each slice using an associated bit of the SSM register bank, the method further comprising:

by the signal processor PCU, using a single-slice halt state output of the Single Slice Mode (SSM) register bank to control signal processing in each slice DP individually, wherein gated clock cells are used to switch a clock supply for registers in each individual DP, and wherein the clock supply is switched on-off in such a manner that each individual slice with its input register and/or accumulator and pipeline control register has its operation stopped and then enabled again by a register in the SSM register bank, wherein during the SIMD type instruction processing a register file unit (RFU) and a memory access register in the signal processor remain constantly in operation, and wherein the PCU writes to the SSM register bank at all times.

* * * * *